Patented Apr. 16, 1946

2,398,410

UNITED STATES PATENT OFFICE 2,398,410

SUBSTITUTED DIPHENYL ACETATE COMPOUNDS AND METHODS FOR PREPARING SAME

Lee C. Cheney, Detroit, and William G. Bywater, Grosse Pointe Woods, Mich., assignors to Parke, Davis & Company, Detroit, Mich., a corporation of Michigan No Drawing. Application June 26, 1944, Serial No. 542,262

4 Claims. (Cl. 260—469)

The invention relates to the preparation of certain new chemical compounds which are useful as intermediates in the manufacture of morpholino esters having antispasmodic properties. More particularly, this invention relates to a class of compounds having the formula

where X is OH or halogen.

This application is a continuation-in-part of our copending application, Serial No. 344,136, filed July 5, 1940.

The invention may be illustrated by the following examples.

*Example 1.—Preparation of ω-bromohexyl diphenylacetate*

A. A mixture of 26.5 grams (0.109 mole) of hexamethylene bromide, 27.5 grams (0.11 mole) of pulverized potassium diphenylacetate and 100 ml. of sodium-dried xylene is efficiently stirred and refluxed in a wax bath maintained at 170–180° for 5 or 6 hours.

The reaction mixture contains ω-bromohexyl diphenylacetate as shown by the following equation:

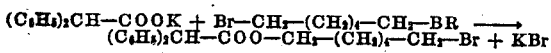

The reaction mixture after cooling may be further reacted with morpholine to obtain δ-(4-morpholino)-n-hexyl diphenylacetate hydrochloride as described in our copending application, Serial No. 514,162, filed December 13, 1943, as a division of our application, Serial No. 344,136.

B. A suspension of 124 g. (0.496 mole) of finely ground potassium diphenylacetate and 231 g. (0.946 mole; 1.9 equivalents) of hexamethylene bromide in one liter of xylene is refluxed with stirring for 25 hours. The reaction mixture is then cooled and filtered to remove the precipitated potassium bromide. The xylene is distilled at atmospheric pressure and the residue fractionally distilled. In this manner there is secured 107.3 g. (98% recovery of the excess) of hexamethylene bromide and 122 g. (65.6%) of ω-bromohexyl diphenylacetate, boiling point 223–6°/2.5 mm.;

and a residue 28 g. (18%) of hexamethylene bis-diphenylacetate. ω-Bromohexyl diphenylacetate has the following formula

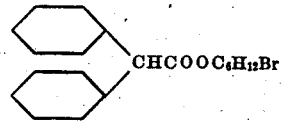

The isolated ω-bromohexyl diphenylacetate may be reacted with morpholine to obtain δ-(4-morpholino)-n-hexyl diphenylacetate hydrochloride and the yields thereby obtained are much higher than with the process specifically described in Serial No. 514,162.

*Example 2.—Preparation of ω-chlorohexyl diphenylacetate*

A solution of 20 g. of thionyl chloride in 25 ml. of carbon tetrachloride is added dropwise in one hour to a well stirred solution of 26.3 g. (0.084 mole) of ω-hydroxyhexyl diphenylacetate in 100 ml. of carbon tetrachloride with no external cooling. The solution is then refluxed and stirred for 2 hours. The excess thionyl chloride is removed and the product distilled in vacuo, thereby obtaining ω-chlorohexyl diphenylacetate, boiling point 215–222°/2.5 mm.;

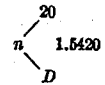

yield: 20 g. or 72%. It has the formula

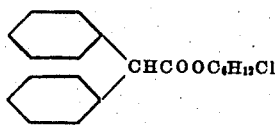

*Example 3.—Preparation of ω-hydroxyhexyl diphenylacetate*

A solution of 115.7 g. (0.5 mole) of diphenylacetyl chloride in 200 ml. of dry acetone is added dropwise with stirring during one hour to a solution of 118 g. (1 mole) of hexamethylene glycol, 79 g. (1 mole) of pyridine and 100 ml. of acetone. After stirring at room temperature for 15 minutes it is stirred and refluxed for one hour and then allowed to stand overnight. Distillation of the reaction mixture yields, after removal of pyridine hydrochloride, 64.4 g. of dark-green product, boiling point 222–232°/4 mm. and a residue of 68.8 g. (27.3%) of hexamethylene bis-diphenylacetate. Redistillation of the crude product gives 47 g. (29.2%) of light yellow ω-hydroxyhexyl diphenylacetate, boiling point 223–5°/3 mm.;

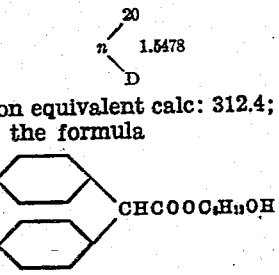

Saponification equivalent calc: 312.4; found: 318, 319. It has the formula

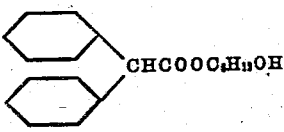

What we claim as our invention is:
1. A compound having the formula

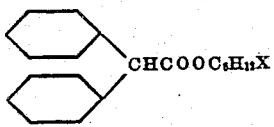

where X is a member of the class consisting of OH and halogen, and substituted on a carbon atom in the ω-position.
2. ω-Chlorohexyl diphenylacetate.
3. ω-Bromohexyl diphenylacetate.
4. ω-Hydroxyhexyl diphenylacetate.

LEE C. CHENEY.
WILLIAM G. BYWATER.